US012116965B2

(12) United States Patent
Cheng et al.

(10) Patent No.: US 12,116,965 B2
(45) Date of Patent: Oct. 15, 2024

(54) FUEL-WATER SEPARATION FILTER ELEMENT CAPABLE OF EXHAUSTING GAS, AND FILTER

(71) Applicant: ZHEJIANG WEITAI AUTOMOBILE PARTS CO., LTD., Huzhou (CN)

(72) Inventors: Jianbin Cheng, Huzhou (CN); Yu Zhang, Huzhou (CN); Qinglin Deng, Huzhou (CN); Xiaowei Ying, Huzhou (CN)

(73) Assignee: ZHEJIANG WEITAI AUTOMOBILE PARTS CO., LTD., Huzhou (CN)

( * ) Notice: Subject to any disclaimer, the term of this patent is extended or adjusted under 35 U.S.C. 154(b) by 0 days.

(21) Appl. No.: 17/962,604

(22) Filed: Oct. 10, 2022

(65) Prior Publication Data

US 2024/0084767 A1 Mar. 14, 2024

(30) Foreign Application Priority Data

Sep. 14, 2022 (CN) ......................... 202211113551.X

(51) Int. Cl.
*F02M 37/48* (2019.01)
*F02M 37/24* (2019.01)
*F02M 37/54* (2019.01)

(52) U.S. Cl.
CPC ............ *F02M 37/54* (2019.01); *F02M 37/24* (2019.01); *F02M 37/48* (2019.01)

(58) Field of Classification Search
None
See application file for complete search history.

(56) References Cited

U.S. PATENT DOCUMENTS 3,931,011 A * 1/1976 Richards .............. B01D 29/902 210/313
5,484,466 A * 1/1996 Brown ................... B01D 46/64 55/498
7,572,306 B2 * 8/2009 Hawkins .............. B01D 36/003 210/438
10,047,708 B2 * 8/2018 Jiang ....................... B01D 29/58
10,774,798 B2 * 9/2020 Jiang .................... B01D 36/003
(Continued)

FOREIGN PATENT DOCUMENTS

CN 105935501 A * 9/2016 ............. B01D 17/02
CN 107061084 A * 8/2017
(Continued)

*Primary Examiner* — Kevin R Steckbauer
(74) *Attorney, Agent, or Firm* — Ladas & Parry LLP

(57) ABSTRACT

The present application discloses a fuel-water separation filter element capable of exhausting gas, and a filter. The filter element includes a filter element frame, a filter medium, and an exhaust valve assembly. An upper end cover and a lower end cover are arranged at an upper end and a lower end of the filter element frame. The upper end cover is provided with a recess surface along an axial direction of the filter element frame. The exhaust valve assembly includes a valve seat and a valve element. The valve seat and the recess surface form an exhaust cavity communicating with the inside of the filter element. The exhaust valve assembly in the present application can effectively exhaust gas in the filter.

9 Claims, 8 Drawing Sheets

(56) References Cited

U.S. PATENT DOCUMENTS

| | | | | |
|---|---|---|---|---|
| 11,338,230 | B2 * | 5/2022 | Fayolle | B01D 35/153 |
| 11,383,185 | B2 * | 7/2022 | Annamalai | B01D 36/003 |
| 11,389,753 | B2 * | 7/2022 | Annamalai | F02M 37/42 |
| 11,471,803 | B2 * | 10/2022 | Jiang | F02M 37/24 |
| 2006/0053756 | A1 * | 3/2006 | Hawkins | B01D 35/147 55/310 |
| 2012/0193275 | A1 * | 8/2012 | Kim | B01D 29/111 210/130 |
| 2016/0222931 | A1 * | 8/2016 | Jiang | B01D 35/153 |
| 2016/0258397 | A1 * | 9/2016 | Jiang | F02M 37/24 |
| 2020/0391146 | A1 * | 12/2020 | Jiang | F02M 37/34 |
| 2024/0084767 | A1 * | 3/2024 | Cheng | F02M 37/42 |

FOREIGN PATENT DOCUMENTS

| | | | | | |
|---|---|---|---|---|---|
| CN | 105935501 | B | * | 12/2019 | B01D 17/02 |
| CN | 110792539 | A | * | 2/2020 | F02M 37/42 |
| CN | 112196709 | A | * | 1/2021 | F02M 37/24 |
| CN | 113217241 | A | * | 8/2021 | F02M 37/32 |
| CN | 113586300 | A | | 11/2021 | |
| CN | 113775451 | A | * | 12/2021 | |
| CN | 114060189 | A | * | 2/2022 | |
| CN | 114382622 | A | * | 4/2022 | |
| CN | 114458495 | A | * | 5/2022 | |
| CN | 114458496 | A | * | 5/2022 | |
| CN | 114458497 | A | * | 5/2022 | |
| CN | 217220277 | U | * | 8/2022 | |
| CN | 115199450 | A | * | 10/2022 | |
| CN | 114458496 | B | * | 5/2023 | |
| CN | 110792539 | B | * | 11/2023 | F02M 37/42 |
| CN | 117738828 | A | * | 3/2024 | F02M 37/24 |
| DE | 2436080 | A | * | 5/1975 | B01D 17/0214 |
| DE | 4330840 | C1 | * | 2/1995 | B01D 29/21 |
| DE | 102005044219 | A1 | * | 3/2006 | B01D 29/21 |
| DE | 102018221412 | A1 | * | 6/2020 | |
| EP | 4342562 | A1 | * | 3/2024 | B01D 46/2414 |
| FR | 2909732 | A1 | * | 6/2008 | B01D 29/21 |
| JP | 2009297714 | A | * | 12/2009 | B01D 29/114 |
| JP | 4399697 | B2 | * | 1/2010 | F02M 37/0035 |
| JP | 5610713 | B2 | * | 10/2014 | B01D 29/114 |
| SE | 450650 | B | * | 7/1987 | F02M 37/221 |
| WO | WO-2011043505 | A1 | * | 4/2011 | B01D 27/08 |
| WO | WO-2015042348 | A1 | * | 3/2015 | B01D 29/21 |
| WO | WO-2024061490 | A1 | * | 3/2024 | B01D 46/2414 |

* cited by examiner

FUEL-WATER SEPARATION FILTER ELEMENT CAPABLE OF EXHAUSTING GAS, AND FILTER

CROSS REFERENCE TO RELATED APPLICATION

This application claims priority to Chinese Patent Application No. 202211113551.X, filed on Sep. 14, 2022, the disclosure of which is incorporated by reference in its entirety.

FIELD OF TECHNOLOGY

The present application relates to the technical field of filtration, in particular to a fuel-water separation filter element capable of exhausting gas, and a filter.

BACKGROUND

During operation of an internal combustion engine, fuel is delivered to a nozzle by a fuel supply system. There is relatively high negative pressure at the front end of a fuel pump. Under the action of the negative pressure, air dissolved in fuel will overflow, and air may also be sucked into a fuel delivery pipeline and connecting pieces due to poor sealing. After the fuel is heated, fuel vapor will also be produced due to evaporation of water dissolved in the fuel. During installation and maintenance of a filter, the air will also be mixed into the pipeline. If these gases are not exhausted in time, gas isolation will occur, resulting in unstable fuel supply in the fuel supply system, abnormal output power or even stalling and other problems of the internal combustion engine, and safety accidents.

In the prior art, disclosed in CN113586300A is an exhaust filter, including a valve seat, a filter element assembly, and a screw seal plate, where a water discharge assembly is installed at the bottom of the valve seat, an annular gasket is installed between the screw seal plate and an upper end cover of the filter element assembly, and an exhaust channel is arranged in the annular gasket. It is recorded in a technical solution that "when gas gathered in a filter passes through a fuel outlet thereof, it will be exhausted from a fuel inlet through an exhaust channel of an annular gasket".

In this technical solution, two ends of the exhaust channel respectively communicate with the fuel outlet and the fuel inlet of this filter, such that a part of unfiltered fuel enters the fuel outlet from the fuel inlet through the exhaust channel, thereby reducing the filtration performance of the filter; the unfiltered fuel is delivered into a fuel nozzle, such that the nozzle is easily blocked and damaged; and in addition, the gas gathered in the filter of this technical solution is exhausted from the fuel inlet of the filter, a flow direction of the exhausted gas is opposite to a flow direction of the fuel, and a pressure of the fuel inlet of the filter is higher than a pressure of the fuel outlet, such that the gas cannot be effectively exhausted.

SUMMARY

In order to solve the technical problem that gas in an existing filter cannot be effectively exhausted, a main objective of the present application is to provide a fuel-water separation filter element capable of exhausting gas, and a filter.

To achieve the above objective, the present application provides a fuel-water separation filter element capable of exhausting gas, including:

- a filter element frame, an upper end cover and a lower end cover being arranged at an upper end and a lower end of the filter element frame, and the upper end cover being provided with a recess surface along an axial direction of the filter element frame;
- a filter medium sleeved on the periphery of the filter element frame, two ends of the filter medium being respectively connected to the upper end cover and the lower end cover; and
- an exhaust valve assembly arranged on the recess surface, the exhaust valve assembly comprising a valve seat and a valve element, the valve seat being fixedly arranged on the recess surface, the valve seat and the recess surface forming an exhaust cavity communicating with the inside of the filter element.

Optionally, the fuel-water separation filter element capable of exhausting gas further includes a water blocking tube arranged in the filter element frame. The water blocking tube and an inner wall of the filter element frame are formed with a water sedimentation channel.

Optionally, the water blocking tube includes a water blocking medium and a tube frame for fixing the water blocking medium.

Optionally, a hook portion is arranged at one end of the water blocking tube close to the upper end cover, a matching portion is arranged on the inner wall of the filter element frame, and the hook portion is correspondingly in clamped connection with the matching portion to fix the water blocking tube.

Optionally, an outer tube wall of the water blocking tube main body is connected to the lower end cover.

Optionally, the water blocking tube is formed with drain holes, and the drain holes communicate with the water sedimentation channel to discharge blocked water.

Optionally, one end of the water blocking tube away from the upper end cover is connected to a water accumulation cavity, and the water accumulation cavity communicates with the water sedimentation channel.

Optionally, two ends of the filter medium are respectively welded with the upper end cover and the lower end cover by hot melt.

Optionally, a paper sleeve is sleeved on an outer side wall of the filter medium.

The present application further provides a filter, including:

- the above fuel-water separation filter element capable of exhausting gas; and
- a housing assembly formed with a water accumulation cavity communicating with a water sedimentation channel, a first channel which fuel enters, and a second channel from which the fuel flows out.

In the technical solution of the present application, when the fuel enters the filter, the gas will be brought into the filter and is continuously accumulated in an upper space outside the filter element; when a pressure difference between the gas outside the filter element and the gas inside the filter element reaches a certain threshold, the valve element moves under the action of pressure, such that the exhaust cavity communicates with the outside of the filter element, and the gas enters the filter element and is pumped out together with clean fuel, thereby exhausting excess gas inside the filter; and after gas exhaust, when the pressure difference between the gas outside the filter element and the gas inside the filter element is less than the threshold, the valve element moves to a state where the exhaust cavity is blocked from the outside of the filter element to prevent the entry of unfiltered fuel. The exhaust valve assembly arranged in the filter element provided by the present application can effectively exhaust the gas in the filter, and can prevent the unfiltered fuel from mixing into the clean fuel inside the filter element, thereby improving the filtration efficiency of the filter.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

In the figures.

Figure 1:
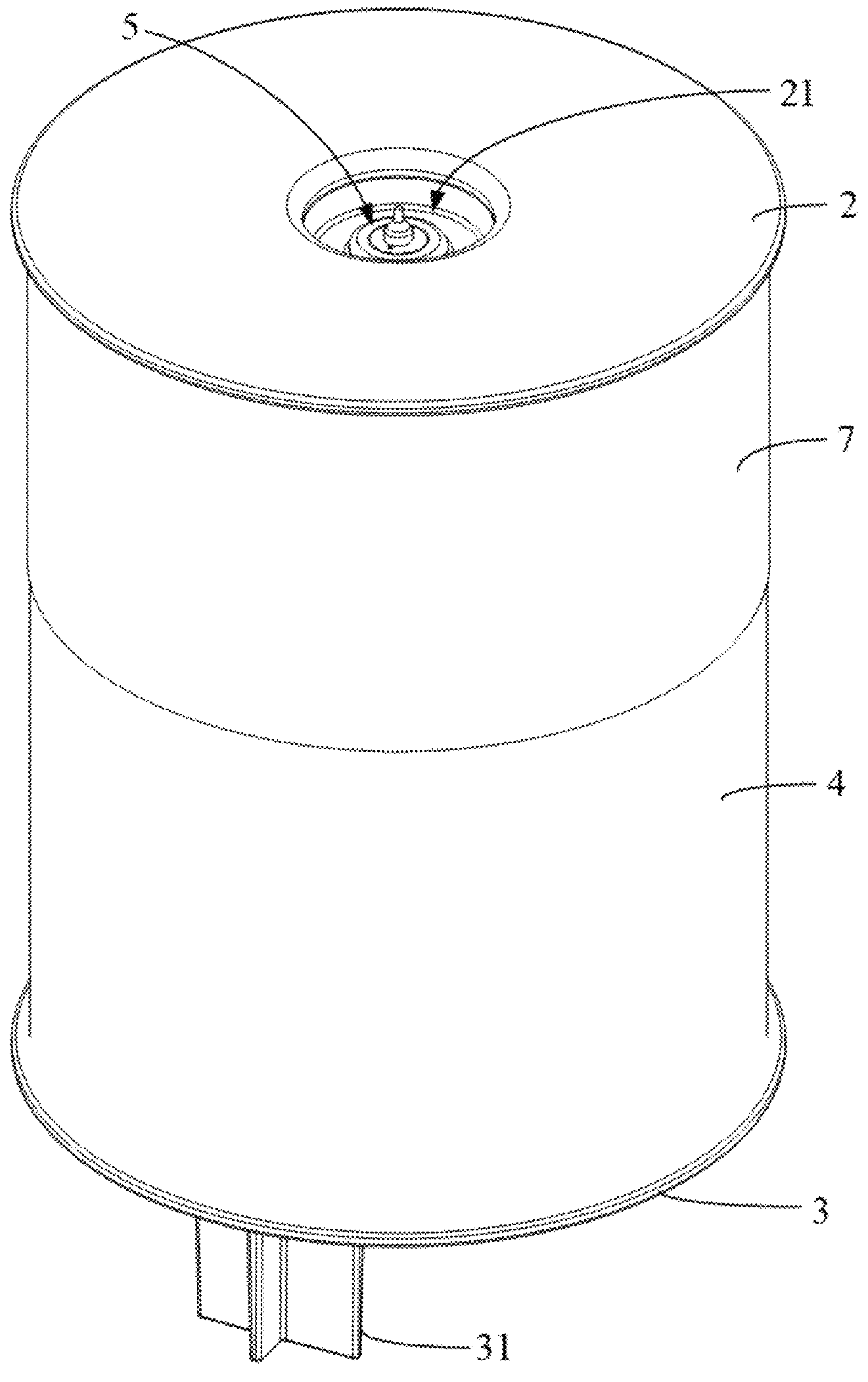
FIG. 1 is a three-dimensional schematic diagram of an embodiment of a fuel-water separation filter element capable of exhausting gas provided by the present application.

100: fuel-water separation filter element capable of exhausting gas; 1: filter element frame; 12: matching portion; 2: upper end cover; 21: recess surface; 21*a*: vent hole; 3: lower end cover; 31: positioning member; 4: filter medium; 5: exhaust valve assembly; 51: valve seat; 51*a*: exhaust cavity; 51*b*: sealing wall; 51*c*: installation hole; 51*d*: exhaust hole; 52: valve element; 522: connecting portion; 523: sealing portion; 53: mesh; 6: water blocking tube; 6*a*: water blocking portion; 6*b*: water blocking tube main body; 61: water sedimentation channel; 62: hook portion; 63: water blocking medium; 64: tube frame; 65: drain hole; 66: third sealing ring; 7: paper sleeve; 8: first sealing ring; 9: second sealing ring; 200: filter; 201: housing assembly; 201*a*: central stand column; 201*b*: water accumulation cavity; 201*c*: first channel; and 201*d*: second channel.

The objective achievement, functional characteristics, and advantages of the present application will be further illustrated with reference to the accompanying drawings in conjunction with the embodiments.

DESCRIPTION OF THE EMBODIMENTS

The technical solutions in the embodiments of the present application are clearly and completely described below with reference to the accompanying drawings in the embodiments of the present application. Apparently, the described embodiments are merely a part rather than all of the embodiments of the present application. All other embodiments obtained by those of ordinary skill in the art based on the embodiments of the present application without creative efforts shall fall within the scope of protection of the present application.

In order to better describe and illustrate the embodiments of the present application, one or more accompanying drawings may be referred to, but additional details or examples used to describe the accompanying drawings should not be considered to limit the scope of any one of creations, presently described embodiments, or preferred modes of the present application.

In the description of the present application, it should be noted that the orientational or positional relationships indicated by the terms "length", "width", "upper", "lower". "front", "back", "left", "right", "top", "bottom", "inside", "outside", etc. are based on the positional relationships shown in the accompanying drawings, are only used for the convenience of describing the present application rather than indicating that the referred device must have a specific orientation or be operated in a specific orientation, and therefore should not be construed as a limitation to the present application.

All technical and scientific terms used herein have the same meaning as commonly understood by those skilled in the art of the present application, unless otherwise defined. The terms used in the specification of the present application are only used for describing specific embodiments, and are not intended to limit the present application.

An existing filter has the following problems: two ends of an exhaust channel respectively communicate with a fuel outlet and a fuel inlet of this filter, such that a part of unfiltered fuel enters the fuel outlet from the fuel inlet through the exhaust channel, thereby reducing the filtration efficiency of the filter; and in addition, gas gathered in the filter of this technical solution is exhausted from the fuel inlet of the filter, a flow direction of the exhausted gas is opposite to a flow direction of the fuel, and a pressure of the fuel inlet of the filter is higher than a pressure of the fuel outlet, such that the gas cannot be effectively exhausted.

In view of this, the present application provides a fuel-water separation filter element capable of exhausting gas. FIGS. 1 to 5 show an embodiment of the fuel-water separation filter element capable of exhausting gas provided by the present application. Referring to FIGS. 1 to 5, the fuel-water separation filter element 100 capable of exhausting gas includes a filter element frame 1, a filter medium 4, and an exhaust valve assembly 5.

Figure 2:
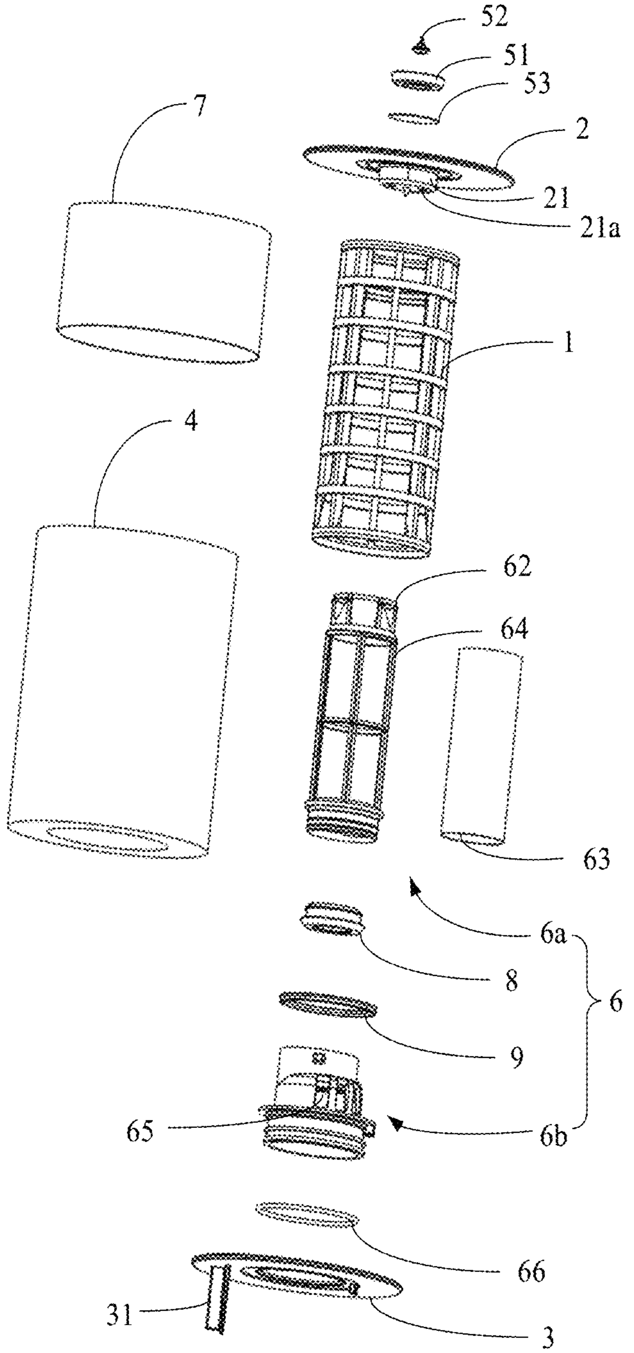
FIG. 2 is an exploded view of FIG. 1.
Figure 3:
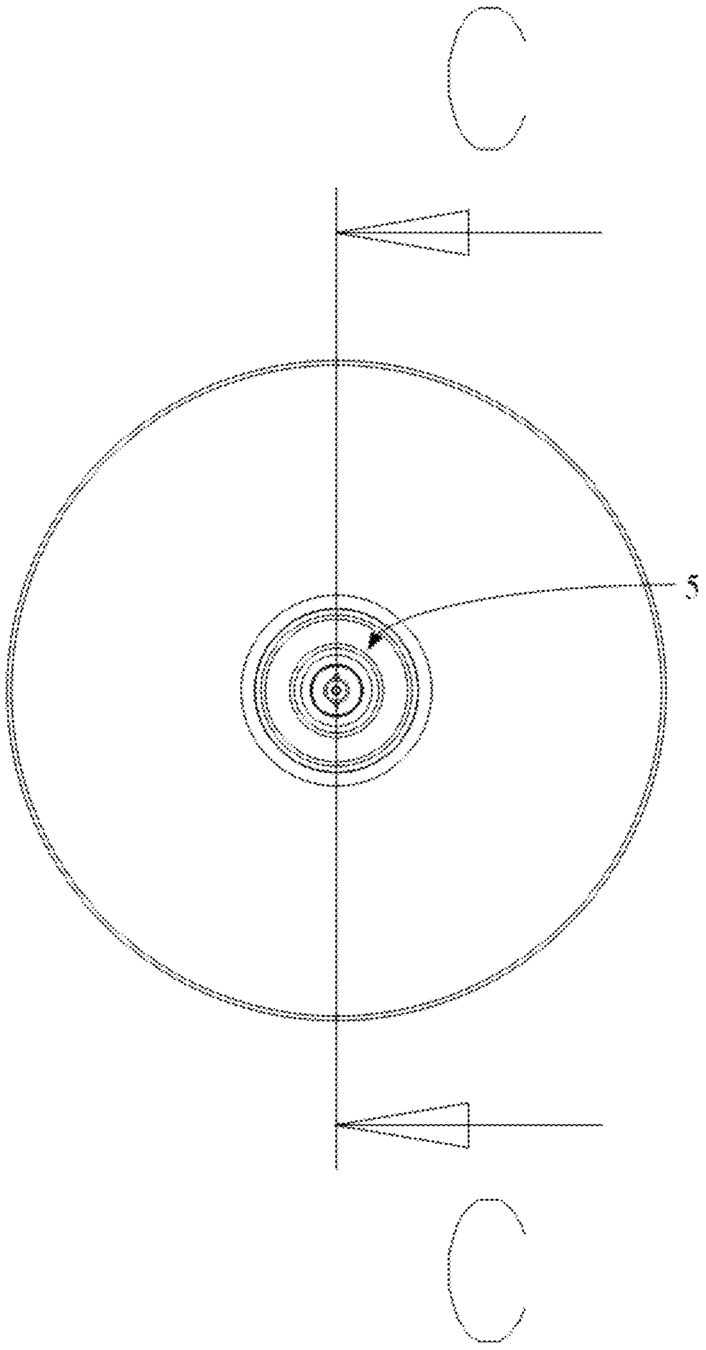
FIG. 3 is a top view of FIG. 1.
Figure 4:
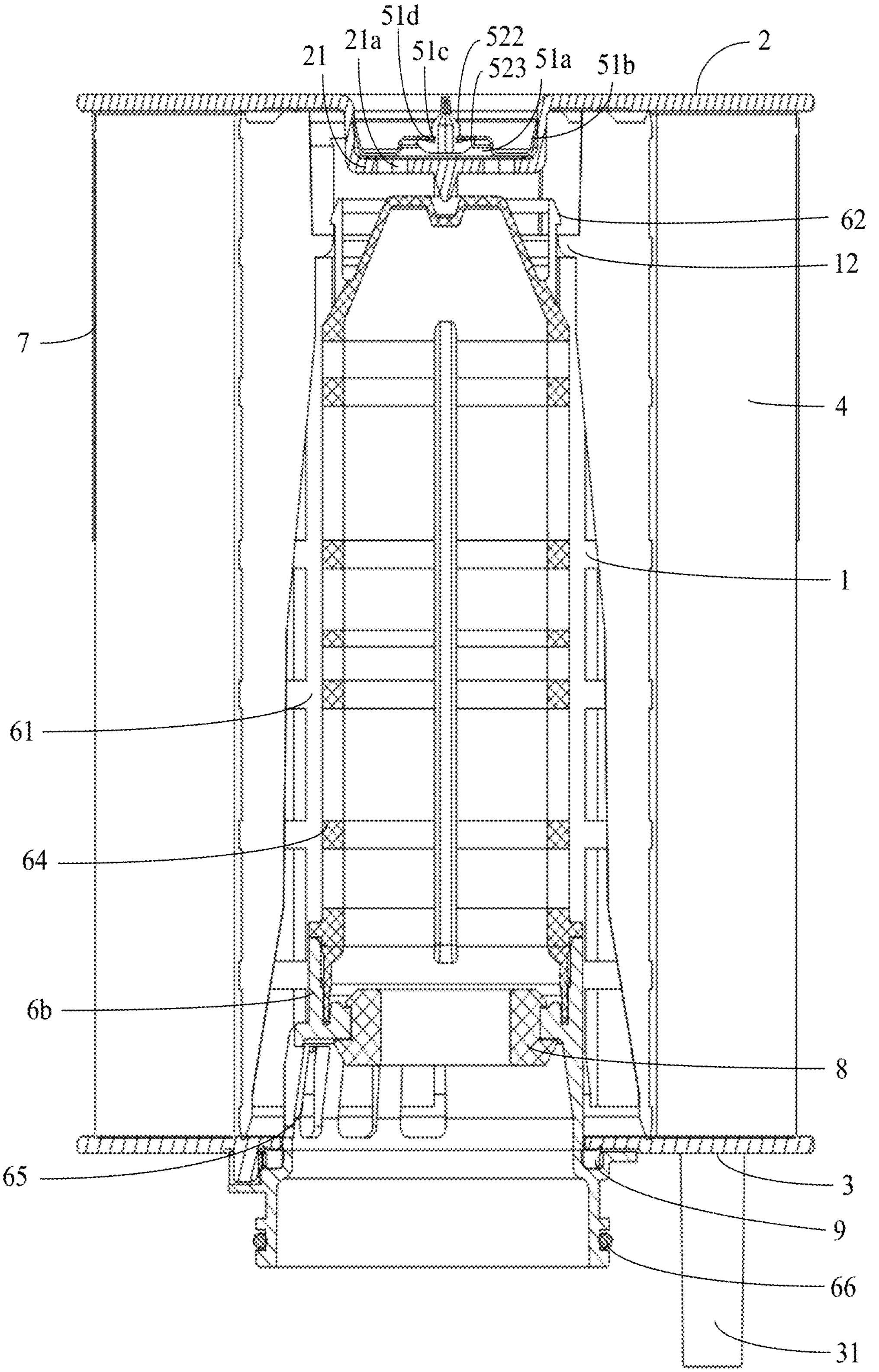
FIG. 4 is a cross-sectional view of a section C-C in FIG. 3.

Referring to FIGS. 1, 2, and 4, an upper end cover 2 and a lower end cover 3 are arranged at an upper end and a lower end of the filter element frame 1. The upper end cover 2 is provided with a recess surface 21 along an axial direction of the filter element frame 1. The filter medium 4 is sleeved on the periphery of the filter element frame 1, and two ends thereof are respectively connected to the upper end cover 2 and the lower end cover 3. The filter medium 4 is commercially available filter paper. The filter element frame 1 is in the shape of a porous column. The exhaust valve assembly 5 is arranged on the recess surface 21, and includes the valve seat 51 and a valve element 52. The middle of the valve seat 51 is raised, and the valve seat and the recess surface 21 form an exhaust cavity 51*a*. The exhaust cavity 51*a* communicates with the inside of the filter element via a vent hole 21*a* in the recess surface 21. The valve element 52 is arranged in the exhaust cavity 51*a*. It should be noted that the valve seat 51 is made of metal such as iron or stainless steel, its periphery extends upward to form a sealing wall 51*b*, and the sealing wall 51*b* may elastically deform inwards or outwards; during installation of the exhaust valve assembly 5, the valve seat 51 is pressed down to the recess surface 21, the sealing wall 51*b* is compressed inwards, and the sealing wall 51*b* is clamped to a side wall of the recess surface 21 by means of the outward elasticity of the sealing wall 51*b*, such that the valve seat 51 is embedded in the recess surface 21; and the sealing wall 51*b* is in close fit with the side wall of the recess surface 21, such that the exhaust cavity 51*a* may be effectively sealed, thereby improving the reliability of the exhaust valve assembly 5.

Specifically, the valve element 52 includes a connecting portion 522 and a sealing portion 523 integrally formed and made of rubber. An installation hole 51*c* and an exhaust hole 51*d* formed in the periphery of the installation hole 51*c* are formed in the center of the valve seat 51. The connecting portion 522 is columnar and is nested in the installation hole 51*c*, such that the valve element 52 is fixed to the valve seat 51. The sealing portion 523 is positioned in the exhaust cavity 51*a*, has the diameter greater than the diameter of the installation hole 51*c*, and can block the exhaust hole 51*d* to seal the exhaust cavity 51. The sealing portion 523 has a cross section in an arch shape with an opening pointing to the valve seat 51, and has elastic potential energy making it adsorbed on the valve seat 51.

As a preferred embodiment, a mesh 53 is installed between the valve seat 51 and the recess surface 21 and is fixed to the vent hole 21*a*, and the mesh 53 is a filter screen with a particle filtering function. When the sealing portion 523 is opened, the exhaust cavity 51 communicates with the outside of the filter element, and a small amount of unfiltered fuel is sucked into the exhaust cavity 51 along with the gas. Because the mesh 53 can filter particles in the fuel, such that the impurity content of the fuel entering the filter element through the vent hole 21*a* is reduced, thereby improving the overall filtration performance of the filter element.

In the technical solution of the present application, when the fuel enters the filter, the gas will be brought into the filter and is continuously accumulated in an upper space outside the filter element; when a pressure difference between the gas outside the filter element and the gas inside the filter element reaches a certain threshold, the valve element moves under the action of pressure, such that the exhaust cavity communicates with the outside of the filter element, and the gas enters the filter element and is pumped out together with clean fuel, thereby exhausting excess gas inside the filter; and after gas exhaust, when the pressure difference between the gas outside the filter element and the gas inside the filter element is less than the threshold, the valve element moves to a state where the exhaust cavity is blocked from the outside of the filter element to prevent the entry of unfiltered fuel. The exhaust valve assembly arranged in the filter element provided by the present application can effectively exhaust the gas in the filter, and can prevent the unfiltered fuel from mixing into the clean fuel inside the filter element, thereby improving the filtration performance of the filter.

Figure 5:
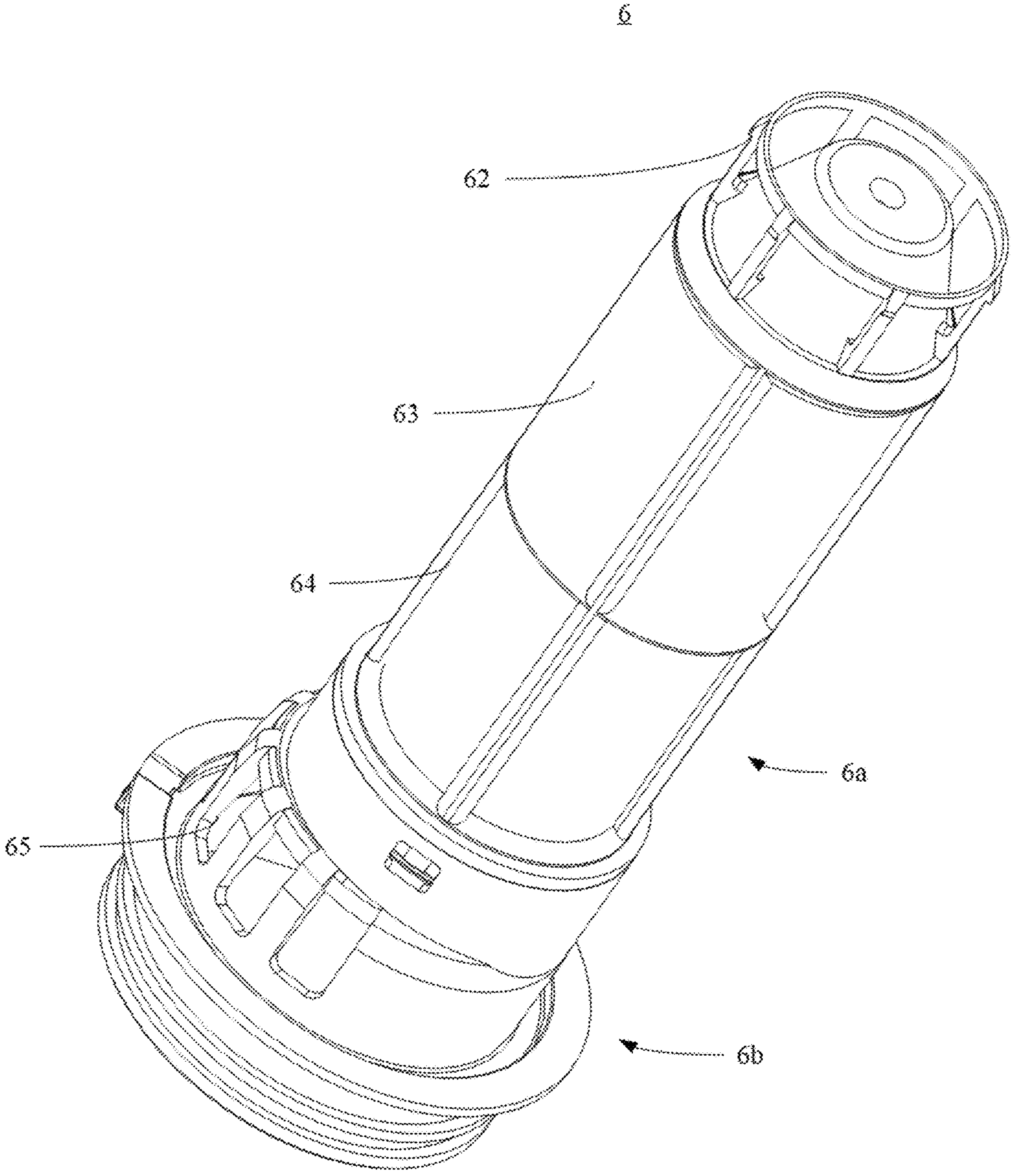
FIG. 5 is a three-dimensional schematic structural diagram of a water blocking tube 6 in FIG. 2.

The water in the fuel affects the performance of an engine. In an embodiment of the present application, in order to block the water in the fuel, the fuel-water separation filter element 100 capable of exhausting gas further includes a water blocking tube 6 arranged in the filter element frame 1. Referring to FIGS. 4 and 5, the filter element frame 1 and the filter medium 4 at the periphery thereof are formed with an inner wall. A water blocking part of the water blocking tube 6 and this inner wall are formed with a water sedimentation channel 61 for sedimenting blocked water in the fuel to a bottom layer.

Specifically, referring to FIGS. 2 and 5, in this embodiment, the water blocking tube 6 includes a water blocking portion 6*a* positioned in the filter element frame 1 and a water blocking tube main body 6*b* connected to the water blocking portion 6*a*. The water blocking portion 6*a* includes a tubular water blocking medium 63 and a tube frame 64 for fixing the water blocking medium 63. The water blocking medium 63 is fuel-water separation mesh cloth with the characteristics of water repelling and fuel passing. The tube frame 64 and the water blocking medium 63 are integrally injection-molded. Moreover, a base of the tube frame 64, that is, a base of the water blocking portion 6*a* is fixedly connected to the water blocking tube main body 6*b* by threaded connection, hot melt welding, etc., of course, the water blocking portion 6*a* may also be integrally injection-molded together with the water blocking tube main body 6*b*. It should be noted that a first sealing ring 8 is arranged on an inner wall of the water blocking portion 6*a*, that is, an inner wall of the tube frame 64 close to a joint with the water blocking tube main body 6*b* and is configured to be hermetically connected to a central stand column 201*a* of a housing assembly 201.

In an embodiment of the present application, for the convenience of installing and replacing accessories, a hook portion 62 is annularly arranged at one end of the water blocking tube 6 close to the upper end cover 2, that is, a top end of the water blocking portion 6*a*. Referring to FIGS. 4 and 5, the hook portion 62 is set to be higher than an end surface of the water blocking portion 6*a*, and a plurality of hook portions are evenly arranged along a circumferential direction; and correspondingly, an inner wall of the filter element frame 1 is annularly raised inwards along a radial direction to form a matching portion 12. During installation of the water blocking tube 6, the hook portion 62 is correspondingly in clamped connection with the matching portion 12 to fix the water blocking tube 6, and the water blocking portion 6*a* is positioned. Compared to a manner of directly fixing the water blocking medium 63 to the filter element frame 1, this installation manner may realize the replacement of the water blocking tube 6, and the clamped connection between the hook portion 62 and the matching portion 12 is released only by exerting an action force making the water blocking tube separated to the water blocking tube; and meanwhile, other accessories may also be replaced and then assembled, thereby improving the adaptability of the filter element assembly, and saving the replacement cost of the filter element.

As a preferred embodiment, each hook portion 62 is integrally formed with a ring-shaped member to improve the stability of the hook portion 62 during installation and removal. In addition, the water blocking portion 6*a* and the water blocking tube main body 6*b* may preferably be in clamped connection.

In an embodiment of the present application, referring to FIG. 4, an outer tube wall of the water blocking tube main body 6*b* is connected to the lower end cover 3. Moreover, a cover plate extends from the outer tube wall of the water blocking tube main body 6*b* to the periphery. A second sealing ring 9 is arranged between the cover plate and the lower end cover 3 to prevent the fuel from flowing in from a gap between the water blocking tube 6 and the filter element frame 1.

In an embodiment of the present application, the water blocking tube 6 is formed with drain holes 65, where the drain holes are formed in the joint between the water blocking portion 6*a* and the water blocking tube main body 6*b*. Referring to FIG. 4, the drain holes 65 communicate with the water sedimentation channel 61 to facilitate the water in the fuel to be sedimented to the outside.

Figure 8:
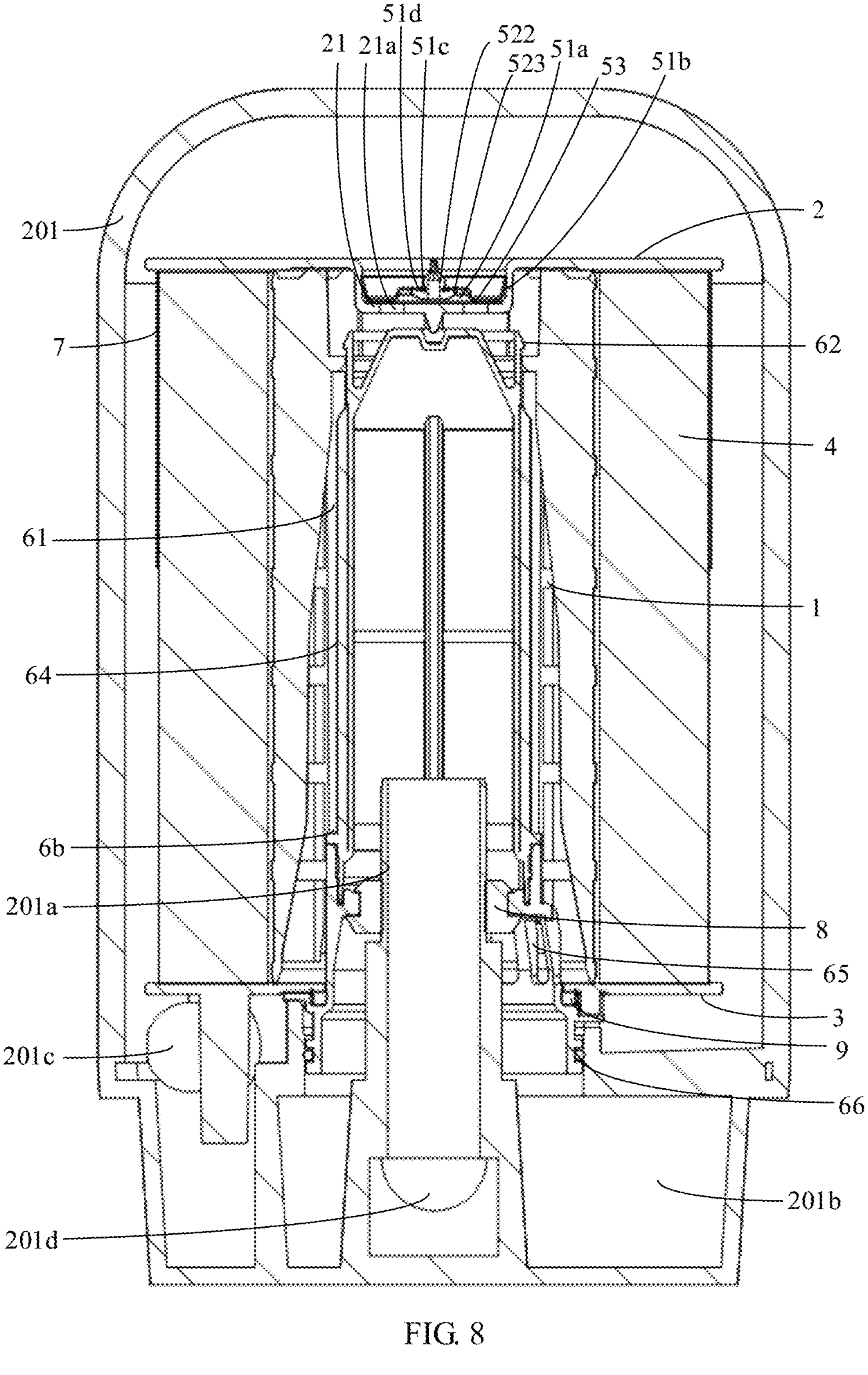
FIG. 8 is a cross-sectional view of a section A-A in FIG. 6.

In an embodiment of the present application, referring to FIGS. 2, 4, and 8, one end of the water blocking tube 6 away from the upper end cover 2, that is, an open end of the water blocking tube main body 6*b* is connected to the housing assembly 201, the connection between the water blocking tube and the housing assembly may be a threaded connection, and a third sealing ring 66 is arranged at the threaded connection position to seal the housing assembly 201 and the water blocking tube 6. A water accumulation cavity 201*b* is formed in the housing assembly 201 and communicates with the water sedimentation channel 61 to collect and accommodate the blocked and sedimented water, and the water is discharged by the housing assembly 201. As a preferred embodiment, a positioning member 31 is arranged on an end surface of the lower end cover 3 and configured for installation and positioning between the filter element and the housing assembly 201.

In an embodiment of the present application, in order to improve the filtration effect of the filter medium 4, two ends of the filter medium 4 are respectively welded with the upper end cover 2 and the lower end cover 3 by hot melt. This manner has a good sealing effect and high production efficiency.

In an embodiment of the present application, referring to FIGS. 1, 2, and 4, a paper sleeve 7 is sleeved on an outer side wall of the filter medium 4, and the paper sleeve 7 is welded with the upper end cover 2 by hot melt. It should be noted that the height of the paper sleeve 7 does not exceed ½ of the height of the filter medium 4.

It should be noted that when the fuel is pumped into the filter, a small amount of gas carried by the fuel and fuel vapor will be gathered in an upper space outside the filter element, and part of the gas enter the filter element through the filter medium 4 and rises into the exhaust cavity 51*a*, such that a pressure difference between the gas in the exhaust cavity 51*a* and the gas outside the filter element cannot reach a threshold for a long time, the sealing portion 523 of the valve element 52 is opened slowly, and the gas in the filter is exhausted for a long period.

As a result, the paper sleeve 7 is arranged on an upper layer of the filter medium 4, such that the gas outside the filter element may be sealed in the filter to form a gas sealing cavity; and during gas gathering, a difference between pressure outside the filter element and pressure in the exhaust cavity 51*a* can reach a threshold more quickly, the sealing portion 523 of the valve element 52 is opened, the gas is exhausted together with clean fuel, and the exhaust period is short.

In addition, after the filter medium 4 is blocked by particles in the fuel, the fuel pumping resistance increases to cause the fuel level to rise, at this time gas pressure in the gas sealing cavity continues to increase, the sealing portion 523 is repeatedly opened until the fuel reaches the top of the filter element, and the filter medium 4 is almost completely blocked, such that the filter element is out of operation. In order to remind a car owner or a maintainer to replace the filter element or the filter, the housing assembly of the filter is provided with a liquid level sensor. When the liquid level exceeds the height of the filter element, an alarm signal is sent out to remind the car owner or the maintainer to carry out replacement.

In another embodiment of the present application, in order to perform manual exhaust, the housing assembly of the filter is provided with a gas pressure sensor and a valve. If a fuel pump is arranged at a fuel outlet to pump fuel, with the increase of fuel pumping resistance, the fuel level continues to rise; when the gas pressure increases to a certain value, the gas pressure sensor sends out an alarm signal to remind a car owner or a maintainer to open the valve to manually exhaust gas; and when the car owner or the maintainer does not perform manual exhaust, the increase of pressure difference may also make the valve element 52 opened to exhaust the gas. If the fuel pump is arranged at a fuel inlet to pump the fuel, the fuel level is higher and more fuel vapor is generated due to movement; when the gas pressure increases to a certain value, the gas pressure sensor sends out the alarm signal to remind the car owner or the maintainer to open the valve to manually exhaust the gas; after gas exhaust, the fuel level falls; and when the car owner or the maintainer does not perform manual exhaust, the increase of pressure difference may also make the valve element 52 opened to exhaust the gas. The gas is exhausted in combination with the exhaust valve assembly by giving an alarm to remind manual exhaust, such that the application scenarios of the filter may be expanded, and the exhaust is more reliable.

Figure 6:
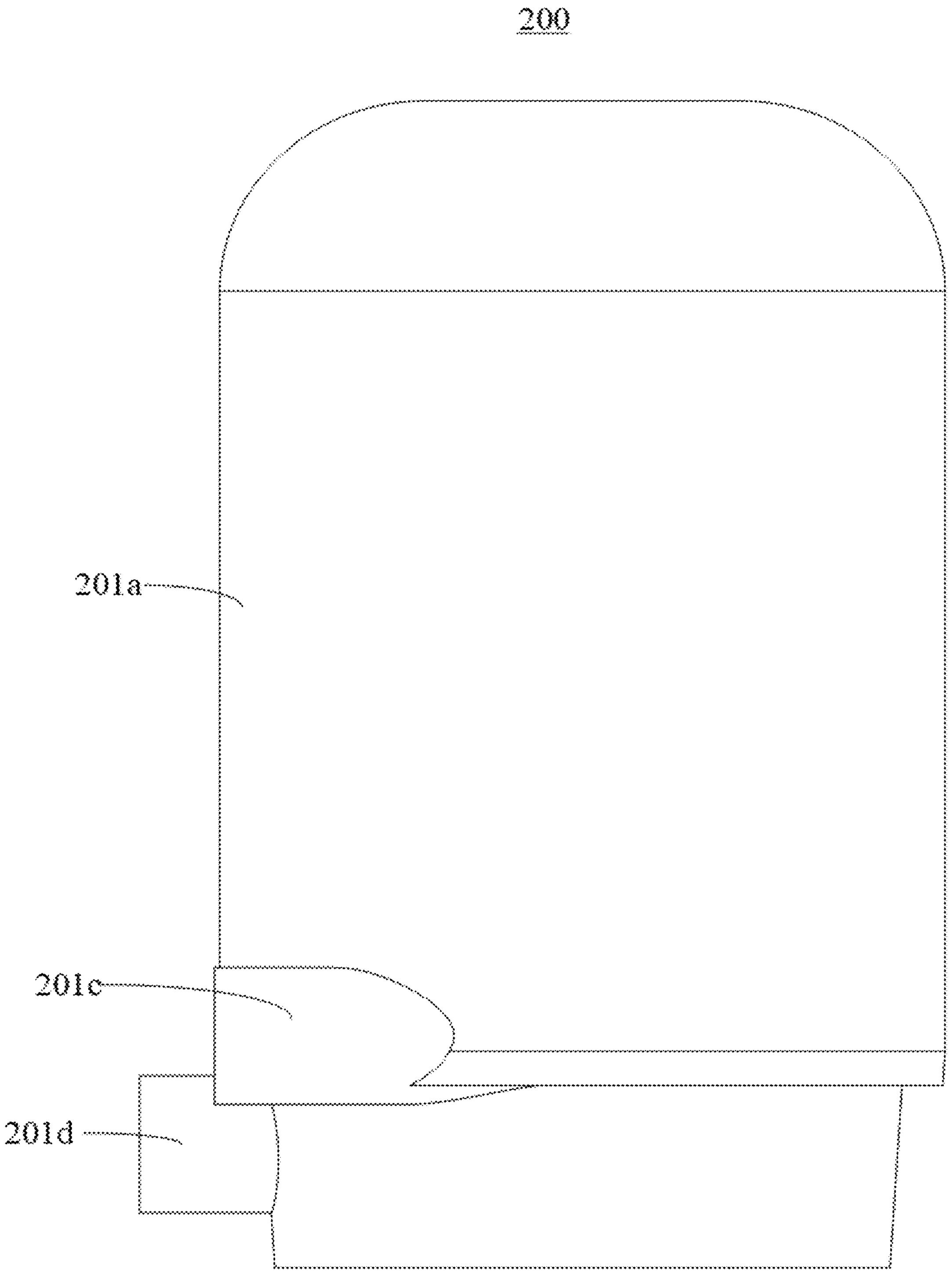
FIG. 6 is a front view of an embodiment of a filter provided by the present application.
Figure 7:
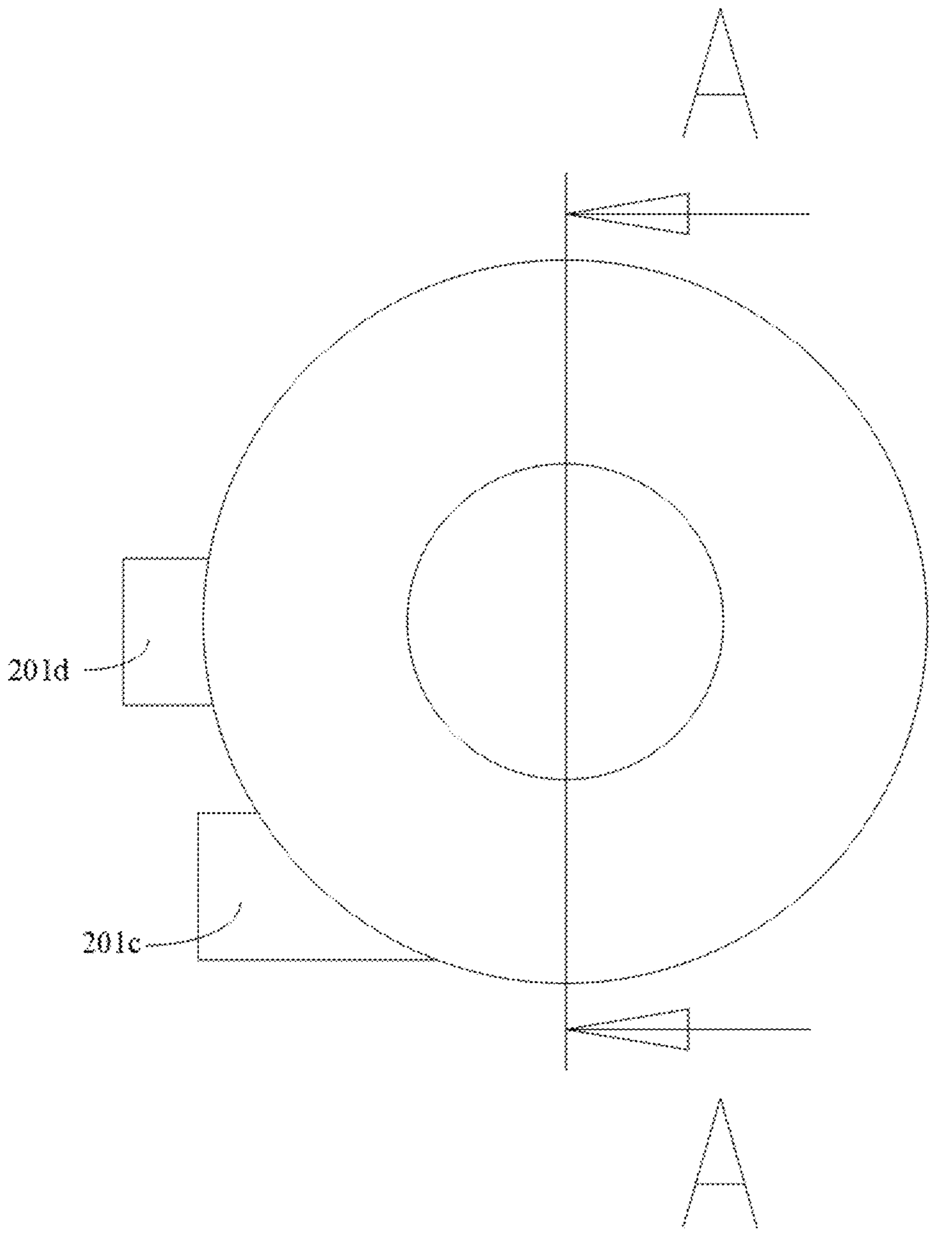
FIG. 7 is a top view of an embodiment of the filter provided by the present application.

The present application further provides a filter 200. FIGS. 6 to 8 show an embodiment of the filter 200 provided by the present application. Referring to FIGS. 6 and 8, the filter 200 includes the above fuel-water separation filter element capable of exhausting gas and a housing assembly 201. The housing assembly 201 is formed with a water accumulation cavity 201*b* communicating with a water sedimentation channel 61, a first channel 201*c* which fuel enters, and a second channel 201*d* from which the fuel flows out. The fuel-water separation filter element capable of exhausting gas is arranged inside the housing assembly 201. The housing assembly 201 is further provided with a central stand column 201*a*. A water blocking portion 6*a* of the fuel-water separation filter element 100 capable of exhausting gas is sleeved on the central stand column 201*a*, a joint between the water blocking portion and the central stand column is sealed by a first sealing ring 8, and the central stand column 201*a* communicates with the second channel 201*d*.

It should be understood that the housing assembly is further provided with a water level sensor and a drainage device (not shown in figure). The water level sensor is configured to monitor the water level of the water accumulation cavity 201*b* to prompt drainage treatment when water in fuel is sedimented to a certain height.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. A fuel-water separation filter element, comprising:

a filter element frame, an upper end cover and a lower end cover being arranged at an upper end and a lower end of the filter element frame, and the upper end cover being provided with a recess surface along an axial direction of the filter element frame;

a filter medium sleeved on the periphery of the filter element frame, two ends of the filter medium being respectively connected to the upper end cover and the lower end cover; and an exhaust valve assembly arranged on the recess surface, the exhaust valve assembly comprising a valve seat and a valve element, the valve seat being fixedly arranged on the recess surface, and the valve seat and the recess surface forming an exhaust cavity communicating with the inside of the filter element;

wherein the valve element comprises a connecting portion and a sealing portion integrally formed and made of rubber, an installation hole and an exhaust hole formed in the periphery of the installation hole are formed in the center of the valve seat, the connecting portion is columnar and is nested in the installation hole, such that the valve element is fixed to the valve seat, the sealing portion is positioned in the exhaust cavity, has a diameter greater than a diameter of the installation hole, and blocks the exhaust hole to seal the exhaust cavity, the sealing portion has a cross section in an arch shape with an opening pointing to the valve seat, such that the sealing portion is elastically biased against the valve seat; and a paper sleeve is sleeved on an outer side wall of the filter medium, wherein the paper sleeve has a wall shape that is circular when viewed in an axial direction.

2. The fuel-water separation filter element according to claim 1, further comprising a water blocking tube arranged in the filter element frame, the water blocking tube and an inner wall of the filter element frame being formed with a water sedimentation channel.

3. The fuel-water separation filter element according to claim 2, wherein the water blocking tube comprises a water blocking medium and a tube frame for fixing the water blocking medium.

4. The fuel-water separation filter element according to claim 2, wherein a hook portion is arranged at one end of the water blocking tube close to the upper end cover, a matching portion is arranged on the inner wall of the filter element frame, and the hook portion is correspondingly in clamped connection with the matching portion to fix the water blocking tube.

5. The fuel-water separation filter element according to claim 2, wherein an outer tube wall of the water blocking tube main body is connected to the lower end cover.

6. The fuel-water separation filter element according to claim 2, wherein the water blocking tube is formed with drain holes, and the drain holes communicate with the water sedimentation channel to discharge blocked water.

7. The fuel-water separation filter element according to claim 2, wherein one end of the water blocking tube away from the upper end cover is connected to a water accumulation cavity, and the water accumulation cavity communicates with the water sedimentation channel.

8. The fuel-water separation filter element according to claim 1, wherein two ends of the filter medium are respectively welded with the upper end cover and the lower end cover by hot melt.

9. A filter, comprising:

a fuel-water separation filter element; and a housing assembly formed with a water accumulation cavity communicating with a water sedimentation channel, a first channel which fuel enters, and a second channel from which the fuel flows out;

wherein the fuel-water separation filter element comprises:

a filter element frame, an upper end cover and a lower end cover being arranged at an upper end and a lower end of the filter element frame, and the upper end cover being provided with a recess surface along an axial direction of the filter element frame;

a filter medium sleeved on the periphery of the filter element frame, two ends of the filter medium being respectively connected to the upper end cover and the lower end cover; and an exhaust valve assembly arranged on the recess surface, the exhaust valve assembly comprising a valve seat and a valve element, the valve seat being fixedly arranged on the recess surface, and the valve seat and the recess surface forming an exhaust cavity communicating with the inside of the filter element;

wherein the valve element comprises a connecting portion and a sealing portion integrally formed and made of rubber, an installation hole and an exhaust hole formed in the periphery of the installation hole are formed in the center of the valve seat, the connecting portion is columnar and is nested in the installation hole, such that the valve element is fixed to the valve seat, the sealing portion is positioned in the exhaust cavity, has a diameter greater than a diameter of the installation hole, and blocks the exhaust hole to seal the exhaust cavity, the sealing portion has a cross section in an arch shape with an opening pointing to the valve seat, such that the sealing portion is elastically biased against the valve seat; and a paper sleeve is sleeved on an outer side wall of the filter medium, wherein the paper sleeve has a wall shape that is circular when viewed in an axial direction.

* * * * *